Figure 1:
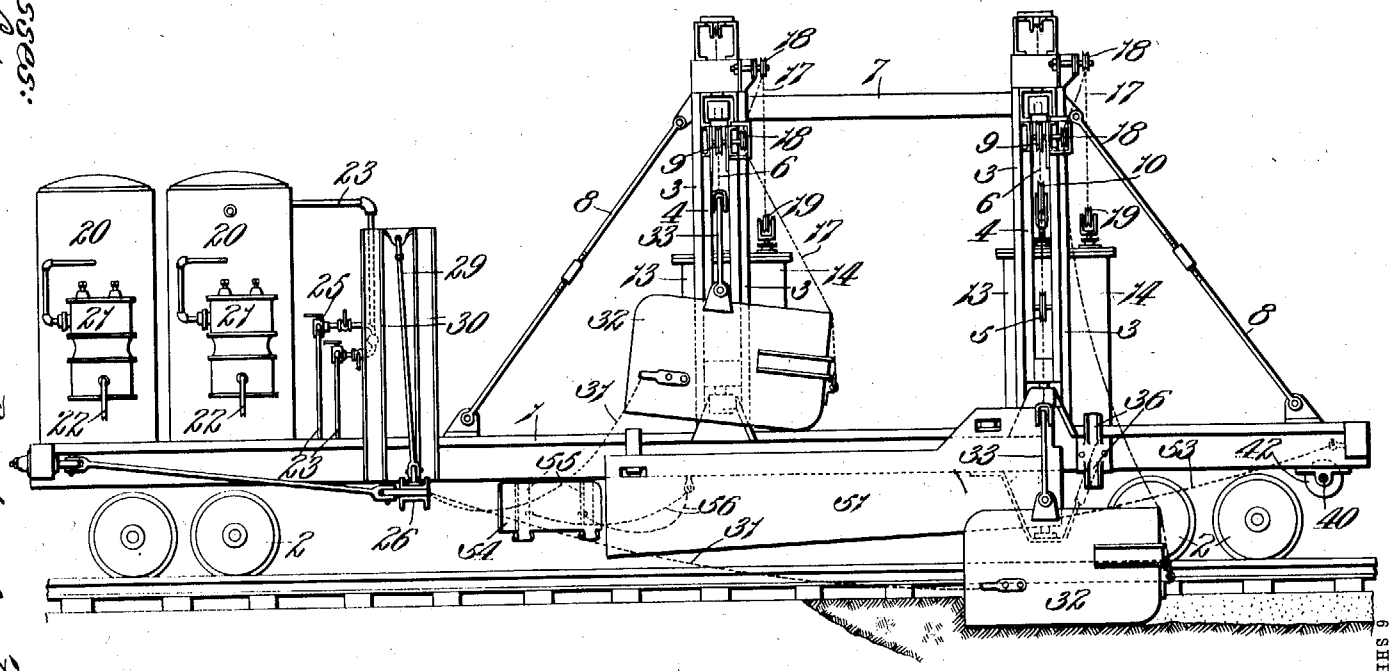

B. BOWMAN.

DITCHING MACHINE.

APPLICATION FILED DEC. 13, 1912.

Reissued Oct. 7, 1913. 13,623.

6 SHEETS—SHEET 1.

Witnesses:
Geo. R. Cadson
C. M. Badger

Inventor:
Benjamin Bowman.
By Bakewell & Chael Attys.

B. BOWMAN.

DITCHING MACHINE.

APPLICATION FILED DEC. 13, 1912.

Reissued Oct. 7, 1913.

13,623.

6 SHEETS—SHEET 2.

Witnesses:
Geo. P. Gadson.
C. M. Badger.

Inventor:
Benjamin Bowman.
By Bakewell & Church Attys.

B. BOWMAN.
DITCHING MACHINE.
APPLICATION FILED DEC. 13, 1912.
Reissued Oct. 7, 1913.
13,623.
6 SHEETS—SHEET 3.
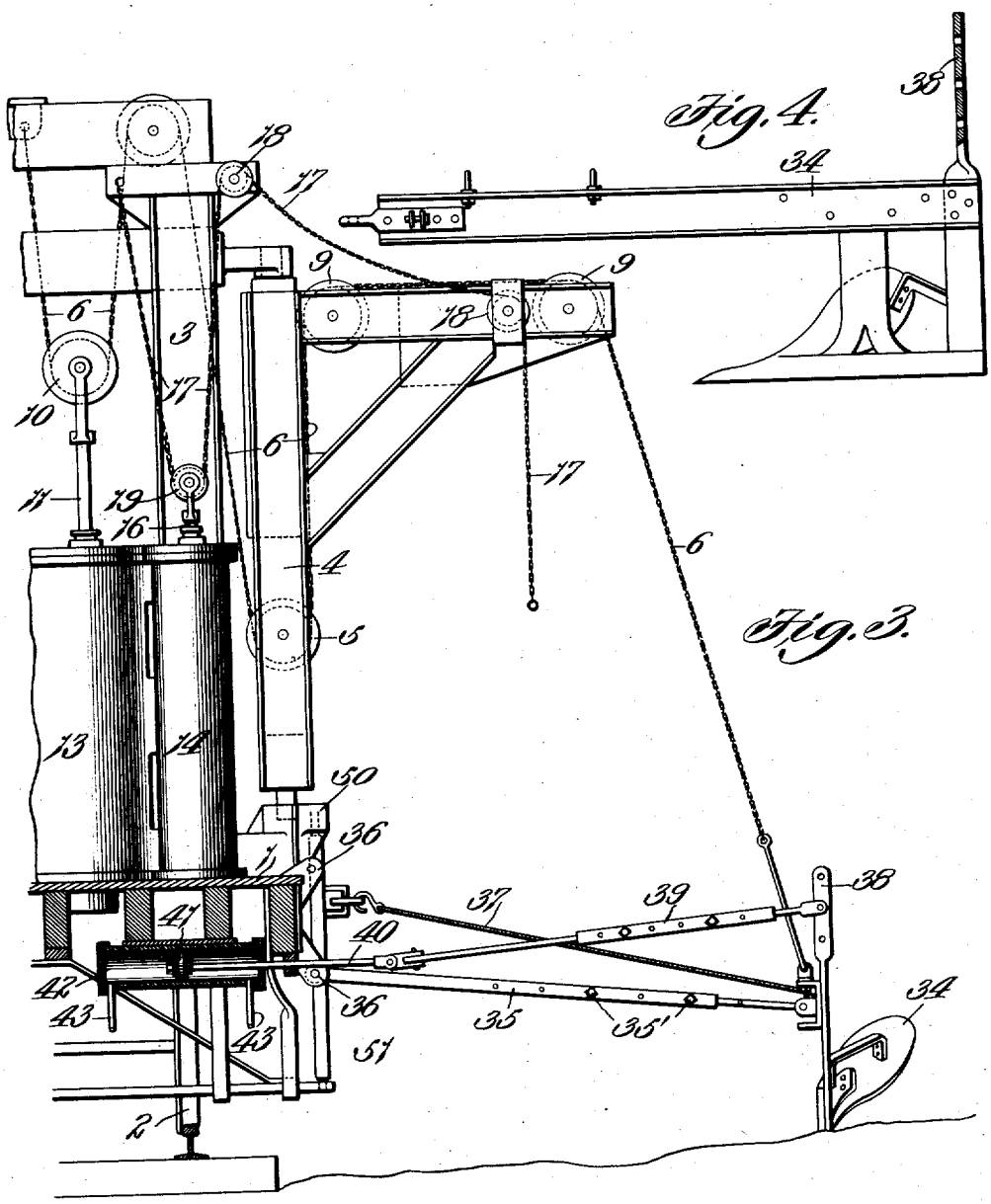
Witnesses:
Geo. P. Redson
C. M. Badger.
Inventor,
Benjamin Bowman.
By Bakewell & Church Attys.

B. BOWMAN.
DITCHING MACHINE.
APPLICATION FILED DEC. 13, 1912.
Reissued Oct. 7, 1913.
13,623.
6 SHEETS—SHEET 4.
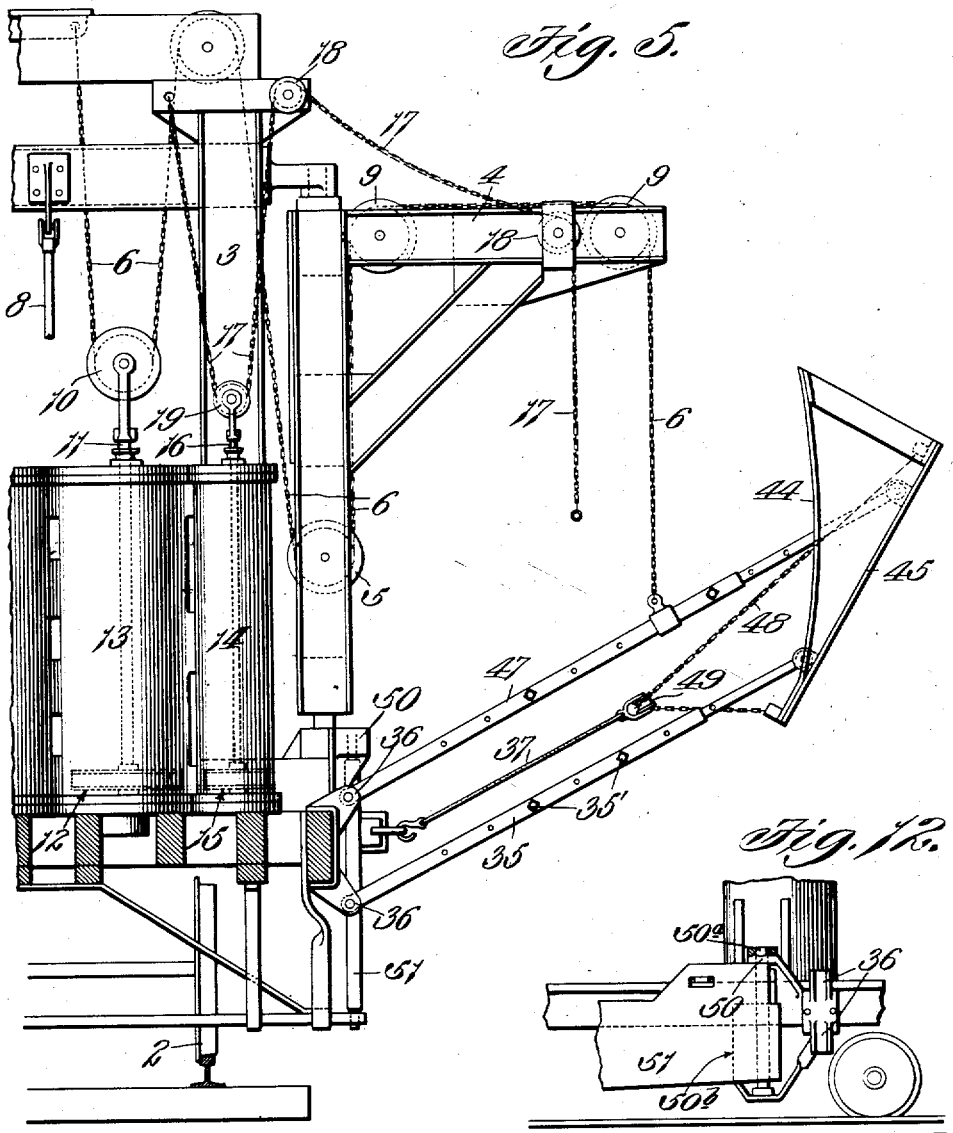
Witnesses:
Geo. R. Radson
C. M. Badger.
Inventor,
Benjamin Bowman.
By Bakewell & Church Attys.

B. BOWMAN.
DITCHING MACHINE.
APPLICATION FILED DEC. 13, 1912.
Reissued Oct. 7, 1913.
13,623.
6 SHEETS—SHEET 5.
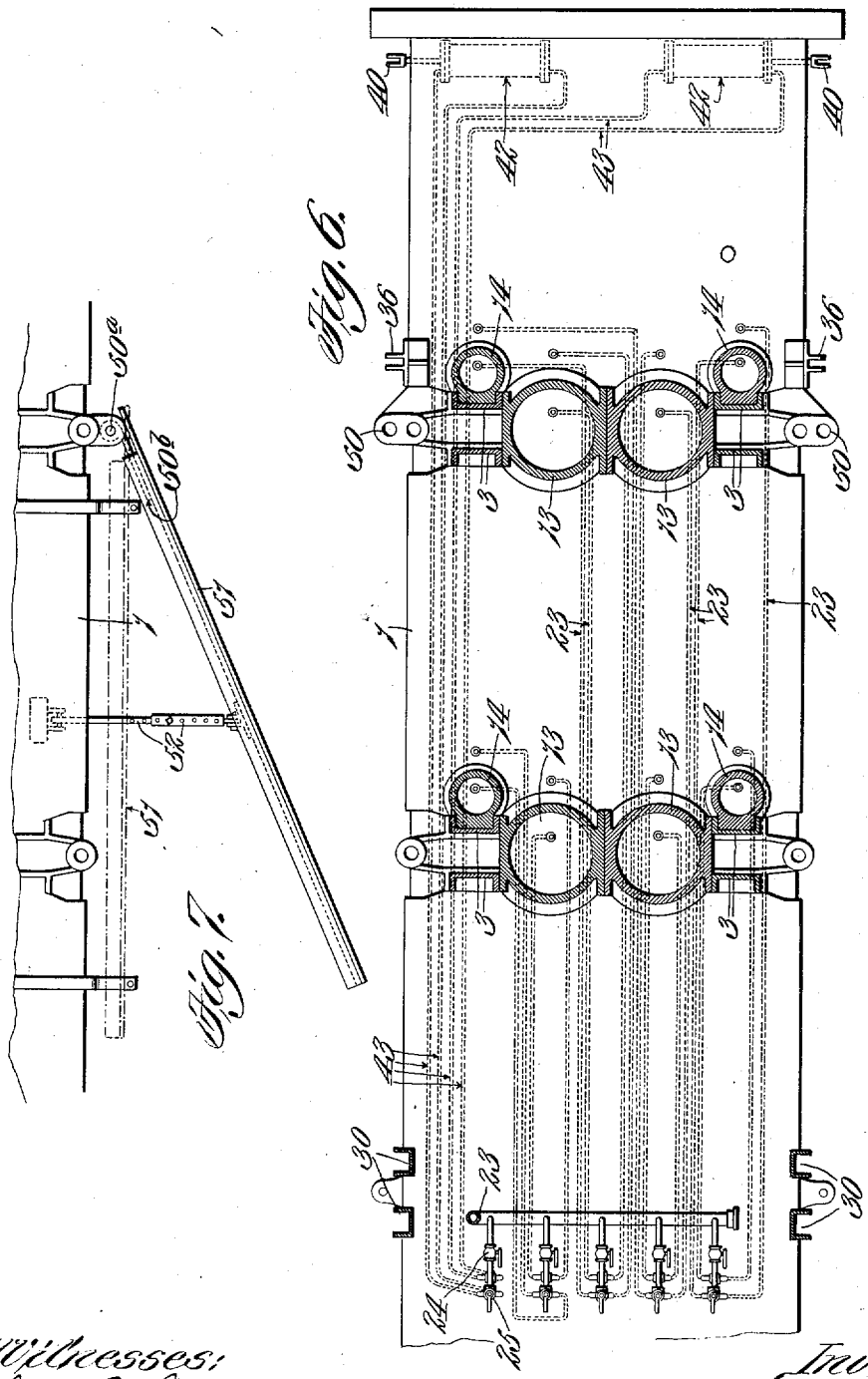
Witnesses:
Geo. R. Redsow
C. M. Badger.
Inventor:
Benjamin Bowman.
By Bakewell & Church Attys.

B. BOWMAN.
DITCHING MACHINE.
APPLICATION FILED DEC. 13, 1912.
Reissued Oct. 7, 1913.
13,623.
6 SHEETS—SHEET 6.
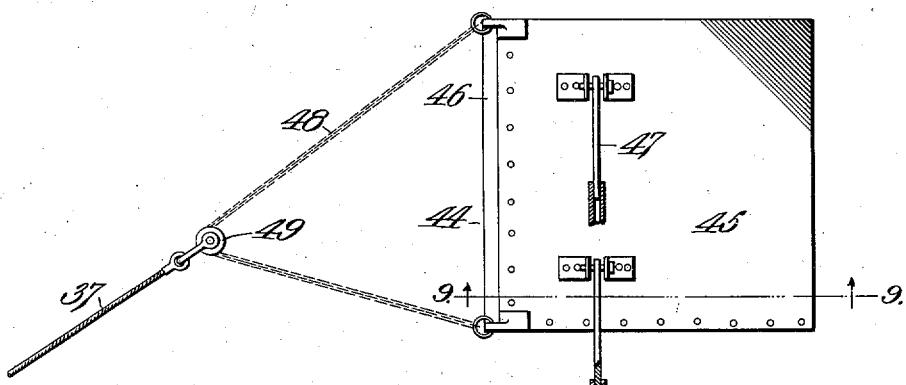
Fig. 10.
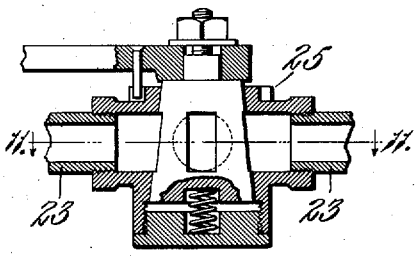
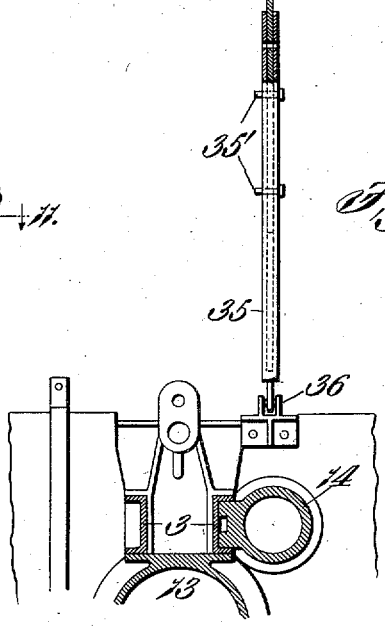
Fig. 8.
Fig. 11.
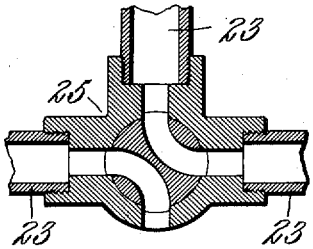
Fig. 9.
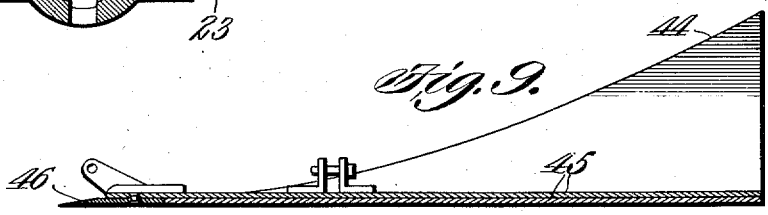
Witnesses:
Geo. R. Gibson
C. M. Badger.
Inventor,
Benjamin Bowman.
By Bakewell & Churchill Attys.

UNITED STATES PATENT OFFICE.

BENJAMIN BOWMAN, OF SPRINGFIELD, MISSOURI.

DITCHING-MACHINE.

13,623. Specification of Reissued Letters Patent. Reissued Oct. 7, 1913.

Original No. 1,003,028, dated September 12, 1911, Serial No. 524,409. Application for reissue filed December 13, 1912. Serial No. 736,639.

*To all whom it may concern:*

Be it known that I, BENJAMIN BOWMAN, a citizen of the United States, residing at Springfield, Greene county, Missouri, have invented a certain new and useful Improvement in Ditching-Machines, of which the following is a full, clear, and exact description, such as will enable others skilled in the art to which it appertains to make and use the same.

This invention relates to ditching machines, and particularly to a machine of the type that comprises means for breaking up the ground in which a ditch is to be formed, means for scooping up the loose material and dumping it either adjacent to the ditch or at a point some distance from the ditch, means for sloping the banks of the ditch, and means for leveling off the dumped material, thereby overcoming the necessity of employing one machine to break up the ground, another machine to scoop up the material, and other machines to slope the banks of the ditch and level the dumped material as was the general practice prior to my invention.

The object of my invention is to provide a complete or self-contained ditching machine of novel construction which is so designed that the various implements or devices used in forming and completing the ditch can be controlled accurately and easily by a few operatives on the platform of the machine.

To this end I have devised a ditching machine consisting of a suitable platform mounted on car trucks, an adjustable crane or derrick mounted on said platform for supporting chains or cables that are used to control the position of certain of the ditching implements, pneumatic means under control of an operator on the platform of the machine for actuating said chains or cables, and plows, scoops and bank-sloping devices, and suitable means for supporting said devices during the ditching operations. Means of novel construction is provided for accurately guiding the plow, and in the form of my invention herein shown, leveling devices are connected to the frame or platform of the machine in such a manner that they can be folded back into an inoperative position when they are not in use.

Figure 2:
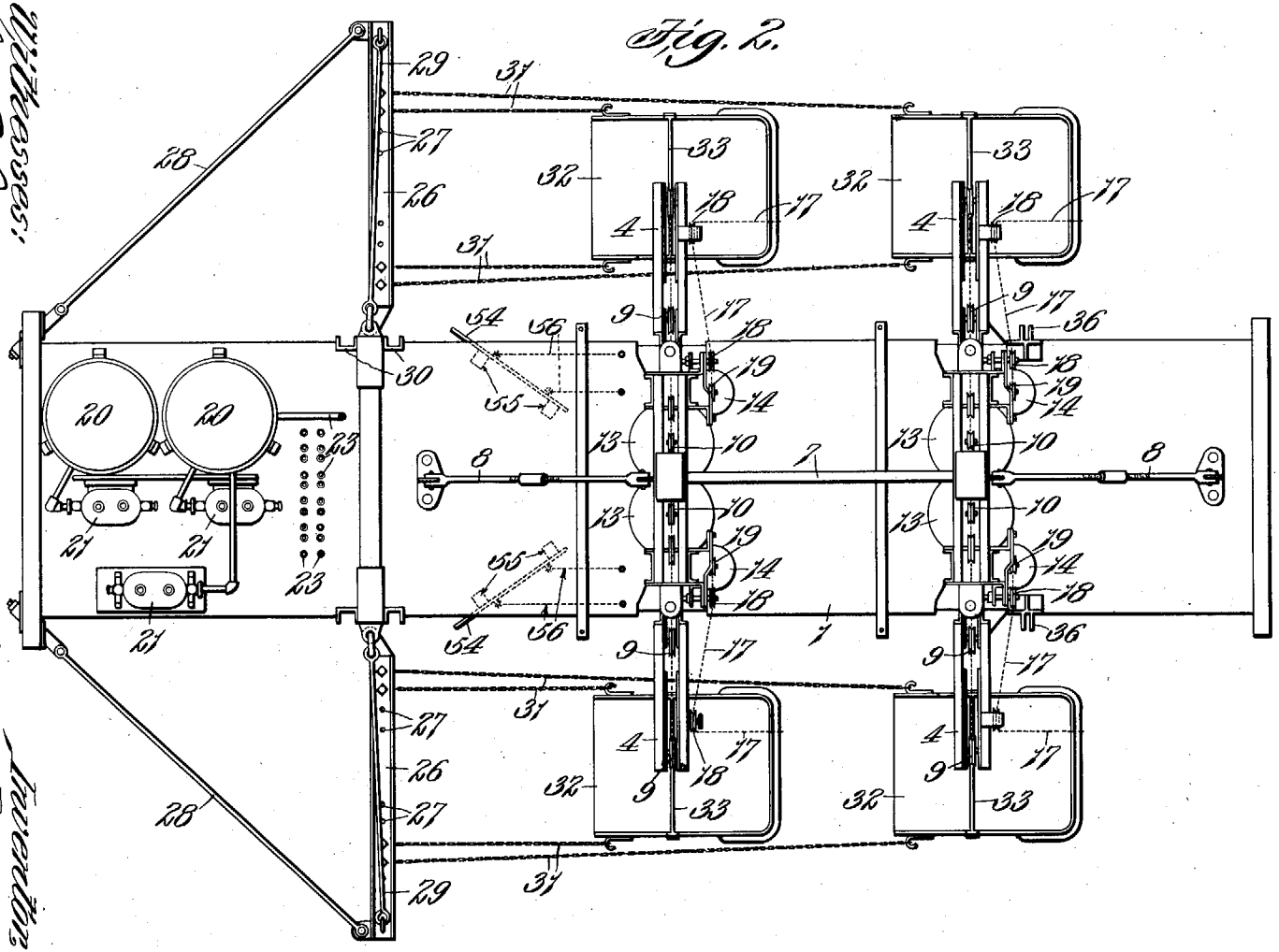

In the accompanying drawings, Figure 1 is a side elevational view of my improved machine showing the scoops arranged in operative position, the scoop on one side of the machine being lowered and in the position it occupies when it is being filled; Fig. 2 is a top plan view of Fig. 1; Fig. 3 is a central vertical transverse sectional view of a portion of the machine showing one of the plows arranged in operative position; Fig. 4 is a detail side elevational view of one of the plows; Fig. 5 is a central vertical transverse sectional view of a portion of the machine showing one of the bank-sloping devices arranged in operative position and elevated preparatory to being moved downwardly into engagement with the bank of the ditch; Fig. 6 is a horizontal sectional view of a portion of the machine; Fig. 7 is a detail top plan view of one of the leveling or spreading blades; Fig. 8 is a top plan view of one of the bank-sloping devices and the means which sustains or supports said device in operative position at one side of the platform of the machine; Fig. 9 is a longitudinal sectional view of said bank-sloping device; Fig. 10 is a detail vertical sectional view of the four-way control valve; Fig. 11 is a transverse sectional view taken on the line 11—11 of Fig. 10; and Fig. 12 is a detail side elevational view of one of the spreading or leveling blades showing how said blade is pivotally connected to the platform of the machine.

In the embodiment of the invention, I provide a supporting platform 1 which may be the bed of a flat car and which is provided with suitable supporting wheels 2. Arranged on the platform 1, near the center of the same, are upright derrick frames 3, on each side of which are pivotally mounted cranes 4, provided with guide pulleys 5 around which are passed hoisting chains 6. The derrick frames 3 are spaced a suitable distance apart and are connected together at their upper ends by a longitudinally disposed brace bar 7 and are further braced by guy rods 8 connected thereto and to the platform of the car.

On the upper ends of the derrick frames are mounted guide pulleys 9 over which the hoisting chains 6 pass, said chains leading downwardly under the pulleys 5, then upwardly over suitable guides and then downwardly under pulleys 10 on the upper ends of piston rods 11 which are provided with pistons 12. The piston rods 11 and pistons 12 operate in hoisting cylinders 13 arranged on the platform 1 beneath or within the derrick frames 3, as shown.

In addition to the hoisting cylinders 13, I also provide dumping cylinders 14 which are of less diameter than the hoisting cylinders and are preferably arranged adjacent to the latter. The hoisting cylinders and the dumping cylinders are preferably secured to and held in position by the derrick frames. The dumping cylinders 14 are provided with pistons 15, the piston rods 16 of which project upwardly through the upper ends of the cylinders and are provided with pulleys 19. Chains 17, which are secured at their inner ends, pass over the guide pulleys 18 and 19 whereby they are operated by the pressure of air on the pistons in the cylinders. The chains 6 and 17 are adapted to be connected with and to operate various implements or devices employed in connection with the ditching operations and which will be hereinafter described.

Located at any suitable position on or beneath the platform 1 are compressed air storage tanks or reservoirs 20, said tanks being here shown as arranged on the platform, adjacent to one end thereof. Connected with the reservoirs or tanks are suitable air compressing pumps 21 of which there may be any desired number. The pumps 21 may be operated by a suitable engine carried by the machine or they may be connected to the boiler of the locomotive employed in propelling the machine by a suitable steam supply pipe 22, as shown in the drawings. The compressed air from the tanks or reservoirs 20 is conducted to the upper and lower ends of the hoisting and dumping cylinders by suitably arranged air conducting pipes 23, in which are arranged cut-off valves 24 and four-way controlling valves 25, said valves 25 being arranged in a group and at a suitable location on the machine, within convenient reach of a single operator who will thus be enabled to readily control the operation of the hoisting and dumping mechanism on both sides of the machine.

Pivoted in suitable bearing brackets on opposite sides of the platform of the machine, adjacent to one end thereof and adapted to be swung outwardly and inwardly to operative and inoperative positions, are draft beams 26 having formed therein a series of bolt holes 27 to receive bolts to which are adjustably connected draft chains which are connected with the implements operated by the machine. The draft beams are connected at their outer ends to the ends of the platform 1 by draft rods 28 and the outer ends of the draft beams are supported by draft supporting rods 29 which extend upwardly and inwardly and are connected at their inner ends to beam supporting frames 30 arranged across the platform of the machine, as shown. When not in use, the draft rods 28 are disconnected from the outer ends of the draft beams 26 and said beams are then folded inwardly alongside the machine to an out of the way position. When in use, the beams 26 project laterally from one or both sides of the machine and to the bolts in the bolt-holes 27 in the beams are connected draft rods or chains 31 which are connected at their opposite ends to the ditch forming devices.

In the ditching operations, are employed a number of implements or devices actuated by the machine and among which are scoops 32, to the opposite sides of which, adjacent to their upper edges are connected bails 33 to which are secured the outer ends of the hoisting chains 6, which pass over the guide pulleys in the cranes 4 and derrick frames and under pulleys 10 on the piston rods 11 of the pistons in the hoisting cylinders 13 and are secured at their inner ends to the derrick frames whereby when said pistons are forced downwardly by the air let into the upper ends of the cylinders, a pull is exerted on the chains and said scoops will be hoisted. To the rear ends of the scoops are connected the outer ends of the dumping chains 17 which pass over the guide pulleys 18 in the derrick frames 3 and cranes 4 and under the pulleys 19 on the piston rods 16 of the pistons 15 in the dumping cylinders 14, whereby when air is let into the upper ends of said cylinders 14, after the scoops have been hoisted, a pull will be exerted on the chains 17, and the rear ends of the scoops will be elevated and at the same time air is released from the hoisting cylinders to permit the forward ends of the scoops to lower, thereby dumping the same. When the scoops are lowered to an operative position, the forward ends of the same are connected by draft chains 31 to the bolts in the bolt-holes 27 of the draft beams whereby said scoops are drawn along the ditch and are thus loaded.

In addition to the scoops, I provide plows 34 which are held out at the desired distance from one or both sides of the machine by connecting bars 35. (See Fig. 3). The bars 35 are each preferably constructed of tubular telescoping sections, whereby the bar may be lengthened or shortened to hold the plow at the desired distance from the side of the machine. The telescoping sections of the bar are provided with a series of transversely disposed apertures, through which are adapted to be inserted bolts 35′ by means of which the sections of the bar are secured in their adjusted positions. The inner end of the outer section of the bar is pivotally connected to a supporting bracket 36, one of which is arranged on each side of the machine, as shown. (See Fig. 3.) The outer end of the inner section of each bar 35 is connected in any suitable manner to the beam of the plow. The plow beam is connected at its forward end to a draft cable 37, the forward end of which is fastened to a suitable connection on one side of the machine, as shown clearly in Fig. 3, whereby each plow is drawn through the ditch. On the rear end of the plow beam is arranged an upwardly projecting arm or standard 38, to which is connected the outer end of a steering bar 39 which is formed in adjustably connected telescoping sections similar to the bar 35 and which is connected at its inner end to the piston rod 40 of a piston 41 operable in a horizontally disposed air cylinder 42, one of which is arranged on each side of and beneath the platform of the machine, adjacent to the end therof, as shown in Fig. 3. The cylinders 42 are connected by suitable air conducting pipes 43 to the compressed air reservoirs 20, and in said pipes are arranged controlling valves whereby the air is admitted to the cylinders and exhausted therefrom to operate the pistons and thereby retract or project the steering rod 39 which will move the rear end of the plow beam in the desired direction for steering the plow along the ditch. To the forward end of the plow beam is connected the outer end of one of the hoisting chains 6 whereby said end of the plow beam and the plow point may be elevated or lowered to cause the plow to dig more or less deeply, as desired.

The ditch formed by the plow has more or less abrupt banks and in order to slope or grade off the sides of the ditch, I provide a bank sloper 44 (see Figs. 5, 8, and 9) which consists of side plates 45 connected together at their forward and lower edges and flaring outwardly toward their upper and rear edges, as shown. The forward edge of the sloper is provided with a cutting blade 46 which engages and loosens the earth forming the sides of the ditch and permits the curved side plates of the sloper to grade down or incline the sides of the ditch. The sloper is held in position at the desired distance beyond the side of the machine by the connecting bar 35, which also forms the connection for the plow, as previously described. In addition to the bar 35, I also preferably employ an additional bar 47 (see Fig. 5) which is constructed in a similar manner to the bar 35 and is connected at its inner end to one arm of the bracket 36 above the bar 35, said bracket being provided with two pairs of connecting lugs or arms arranged in vertically spaced relation and diverging as shown in Figs. 3 and 5. The outer ends of the bars 35 and 47 are suitably connected to bearing lugs or ears on the inner side plate 45 of the sloper. The sloper has connected to the opposite ends of its forward edge, a draft chain 48 which is engaged by a draft pulley 49, said pulley being connected to the draft cable 37 of the plow, whereby the bank sloper is drawn along the ditch. The bank sloper is supported in operative position by one of the hoisting cables 6 to the outer end of which it is connected in any suitable manner.

Pivotally connected at their forward ends to suitable bearing brackets 50 arranged on the opposite sides of the platform 1, adjacent to the brackets 36, are dirt-spreading or scraping blades 51 which are adapted to be swung inwardly and outwardly from the sides of the machine at any desired angle to scrape or spread the dirt, adjacent the opposite sides of the machine (see Figs. 1 and 7). The dirt-spreading blades 51 are held at the desired angle at the sides of the machine by brace rods 52 which are preferably formed in adjustably connected telescoping sections whereby the bars may be lengthened or shortened to hold the blades at the desired angle. The inner ends of the bars 52 are pivotally connected to suitable brackets on the under side of the platform 1 and at their outer ends are pivotally connected to the inner sides of the blades. The forward ends of the spreading or leveling blades 51 are pivotally connected to the bearing brackets 50 on the platform of the machine in such a manner that said blades may be lowered and raised to operative and inoperative position. In the embodiment of my invention herein shown the brackets 50 are provided with pintles $50^a$, as shown in Fig. 12, and each blade is provided at its front end with an inwardly projecting bearing $50^b$ through which the pintle $50^a$ passes, as shown in Fig. 7, said bearing $50^b$ being of less depth than the length of the pintle $50^a$ so that the blade can be raised and lowered, the bearing $50^b$ sliding upwardly and downwardly on the pintle $50^a$. The blades are lowered and raised by hoisting chains 6 which are connected at their lower ends thereto in any suitable manner. By disconnecting the brace bars 52 from the blades, the latter may be swung back against the sides of the machine to an inoperative and out of the way position. The lower ends of the bearing brackets 50 to which the forward ends of the scraping blades are connected, are braced by chains or rods 53, as shown in broken lines in Fig. 1, which connect said lower ends of the brackets to the end of the platform, as shown.

In addition to the various ditching and grading devices herein described, I provide on each side of the machine small spreading or scraping plows, comprising blades or plates 54 which are hingedly connected by hangers 55 to the under side of the machine. The blades 54 are disposed at a suitable angle and when in operative position are connected to draft chains 56 which are secured at their opposite ends to the frame of the machine. These scraping plows are provided to scrape off from the ends of the ties and the ballast outside the railway rails, any dirt which may have fallen thereon. When not in use the blades 54 may be folded up under the platform of the machine and held in any suitable manner.

Sufficient space is provided on the platform 1 of the machine between and on each side of the operating cylinders to receive the various implements used in connection with the machine when the implements are not in service and suitable boxes or receptacles are provided to receive the various bracing and operating bars and rods used in connection with the operation of the machine.

When a ditch is to be formed my improved ditching machine is connected to a locomotive or some other suitable motive power and the plows are arranged in operative position in the manner previously described and as shown in Fig. 3 so that they will loosen the dirt in which the ditch is to be formed. After the dirt has been plowed up the plows are removed or arranged in an inoperative position and the scoops are then connected to the operating chains or cables 6 and 17. After the scoops have been properly positioned air is admitted to the cylinders 14 so as to hold the scoops securely in position and cause them to cut into the material that has been loosened by the plows, thereby insuring filling of the scoops. After the scoops have ben filled air is admitted to the cylinders 13 so as to raise the scoops, and after the machine has been moved to the point where the material is to be dumped air is admitted to the cylinders 14 so as to tilt the scoops and thus permit the material in same to be discharged. After the loosened material has been removed by the scoops in the manner above-described the scoops are disconnected from the operating chains 6 and 17 and the bank-sloping devices are arranged in operative position in the manner previously described and as illustrated in Fig. 5, the operator on the platform of the machine being able to accurately control the position of the bank-sloping devices by means of the air-cylinders 13 and the operating chains or cables 6 which are connected to the members 47 that project laterally from the sides of the machine and support the bank-sloping devices. If it is desired to level off the dumped material the scraping or spreading blades 51 are arranged in operative position as shown in Fig. 7.

Various changes in the form, proportion and the minor details of construction may be resorted to without departing from the principle or sacrificing any of the advantages of the invention, as defined in the appended claims.

Having thus described my invention, what I claim as new and desire to secure by Letters Patent is:

1. In a ditching machine, the combination of a wheeled supporting structure, an implement connecting bar connected to said structure and extending laterally therefrom, said bar being composed of telescopically engaged sections, means for adjustably connecting said sections, a longitudinally extensible steering bar arranged in a plane above said connecting bar, means connected to the inner end of said steering bar for projecting or retracting it, and implement raising and lowering means mounted on said structure.

2. In a ditching machine, the combination of a wheeled supporting structure, an implement connecting bar connected to said structure and extending laterally therefrom, means for varying the length of said bar, a longitudinally extensible steering bar arranged in a plane above said connecting bar, a horizontally arranged cylinder on said supporting structure, a piston operable in said cylinder and connected with the inner end of said steering bar, and an operating fluid for said piston under the control of the operator for projecting and retracting said steering bar.

3. In a ditching machine, the combination of a wheeled supporting structure, an implement connecting bar connected to one side of said structure and extending laterally therefrom, means for varying the length of said bar, a draft cable connected at one end to said structure at a point in advance of said connecting bar and adapted to be connected at its other end to the implement to be operated, a steering bar composed of telescopically engaged sections provided with means for adjustably connecting them, means for connecting one end of said bar to an implement to be guided, projecting and retracting means connected with the other end of said bar, and means for raising and lowering an implement.

In testimony whereof, I hereunto affix my signature in the presence of two witnesses, this sixth day of December, 1912.

BENJAMIN BOWMAN.

Witnesses:
WELLS L. CHURCH,
CORA M. BADGER.